C. W. BEAUFORT.
BALL AND SOCKET PIPE JOINT.
APPLICATION FILED JULY 1, 1914.
1,138,071.
Patented May 4, 1915.
2 SHEETS—SHEET 1.
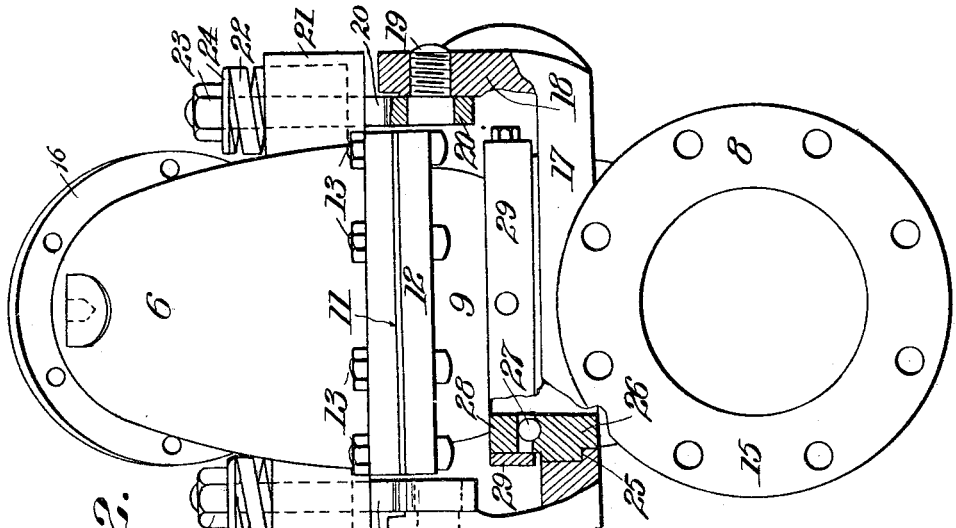
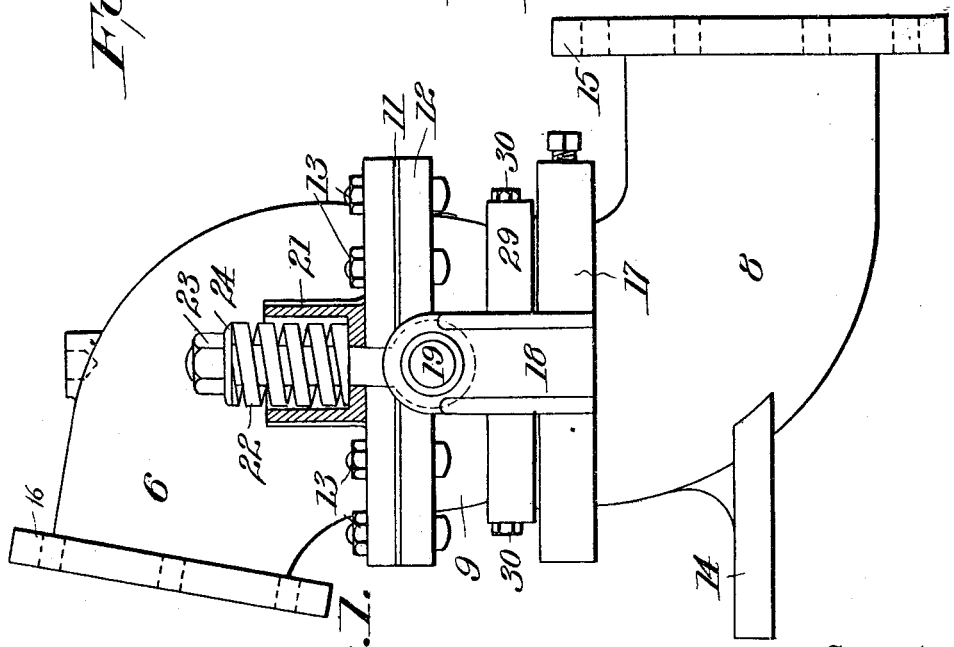
Witnesses
Inventor
Charles W. Beaufort
Attorney

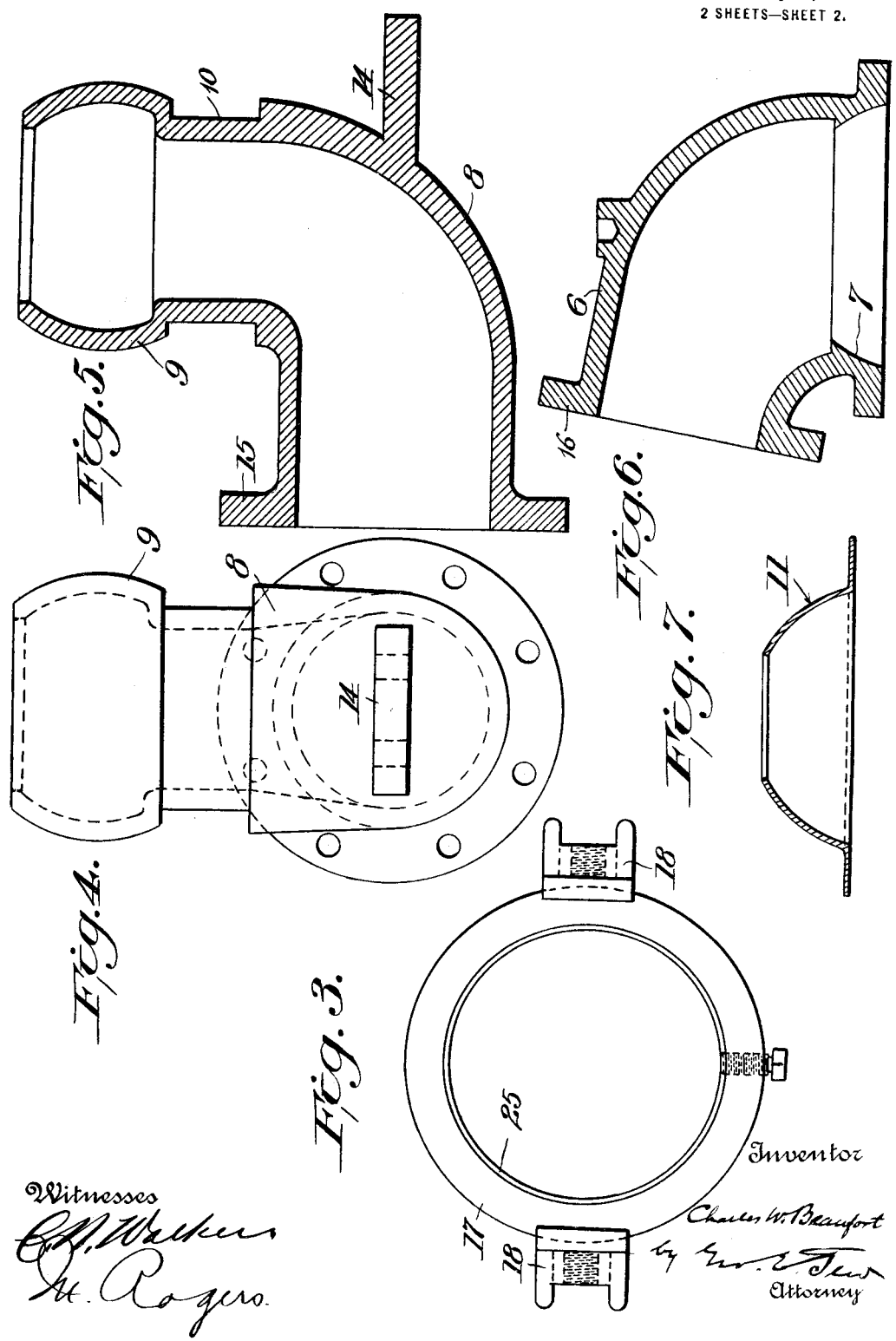

UNITED STATES PATENT OFFICE.

CHARLES W. BEAUFORT, OF AUGUSTA, GEORGIA.

BALL-AND-SOCKET PIPE-JOINT.

1,138,071. Specification of Letters Patent. Patented May 4, 1915.

Application filed July 1, 1914. Serial No. 848,517.

*To all whom it may concern:*

Be it known that I, CHARLES W. BEAUFORT, a citizen of the United States, residing at Augusta, in the county of Richmond and State of Georgia, have invented certain new and useful Improvements in Ball-and-Socket Pipe-Joints, of which the following is a specification.

This invention relates to ball and socket joints or couplings particularly adapted and intended for use in connection with so called hydraulic giants or guns, for delivering high pressure water in hydraulic mining or excavation, but it is not limited to such use and may be applied wherever found useful to provide a flexible coupling between pipes, especially those subjected to high pressure. In the use of such hydraulic swiveling nozzles defects have appeared leading to leakage at the joint, incident to wear producing changes in the pivotal joint or axis, and it is the object of the present invention to correct this, and to provide spring means for holding the ball and socket members together under all conditions, and to take up wear as it occurs.

An embodiment of the invention is illustrated in the accompanying drawings in which;

Figure 1 is a side elevation, partly in section, of the coupling, or joint. Fig. 2 is an end elevation partly in section. Fig. 3 is a top view of a yoke member. Fig. 4 is an end view, and Fig. 5 is a section, of the ball member. Fig. 6 is a section of the socket member, and Fig. 7 is a section of a gasket.

Referring specifically to the drawings, 6 indicates the socket member having a segmental seat 7 and 8 indicates the ball member having a segmental head 9 connected to the body of the member by a neck 10 of smaller diameter. The gasket 11 fits against the seat 7 of the socket member and is pressed thereto by the head or ball 9, the edge of the gasket being clamped to the flange of the socket member by a ring 12 and bolts 13. The ball member has a flange 14 for attachment to a support or the like, and a suitable flange 15 for connection to an inlet pipe. The socket member has a flange 16 for connection to the nozzle.

A yoke member 17 fits over the neck of the ball member and has two opposite arms 18 projecting up beside the joint, and these arms are tapped to receive screws 19 which form the pivots of a pair of links comprising eye-bolts 20, the pivotal axis being on a line with the spherical center of the ball and socket, thereby forming a universal joint.

The eye-bolts 20 project through lugs 21 formed on the socket member, at opposite sides thereof, and these lugs are recessed to form seats for heavy coil springs 22 which surround the stems of the eye-bolts and are held under pressure by nuts 23 and washers 24.

The ring part of the yoke 17 has a shoulder 25 against which is seated a ring 26 extending around the neck 10 with a ball race in the top thereof to hold bearings 27, the upper part of the bearing being formed by a ring 28 extending around the neck, and abutting against the head 9, and the balls being held by a retaining band 29 fastened to the upper ring by cap screws 30. The rings 26 and 28 are made in halves so that they can be assembled on the neck.

Compression of the springs 22 presses the ball and socket members together, and in connection with the gasket forms a tight joint, and the pivotal arrangement of the eye-bolts permits the two members of the joint to accommodate themselves to each other under all conditions, and wear of the gasket or meeting surfaces is taken up by the springs as fast as it occurs. It is obvious that the pressure may be regulated by adjustment of the nuts 23, the joint being thereby tightened or loosened. In one direction, the joint turns on the vertical axis of the ball and socket, and in the other direction the joint flexes on the horizontal axis of the bolts 19, the segmental surfaces sliding upon each other. The spring contact permits movement of the joint members in one direction, without excessive binding, and the ball bearings permit a relative movement in the other direction, whereby the joint members can be adjusted to any angle with respect to each other.

The particular arrangement of the springs shown in the drawing is not essential to the performance of the invention, and various changes or modifications may be made within the scope thereof.

I claim:—

1. The combination of ball and socket pipe members fitting together, a yoke rotatably held on one of said members, and pivoted yielding connections between said yoke and the other member.

2. The combination of ball and socket pipe members fitting together, a turning yoke mounted on one of said members and having arms at opposite sides projecting beside the other member, and longitudinally yieldable connections pivoted to said arms and engaging said other member.

3. The combination of ball and socket pipe members fitting together, one of said members having lugs at opposite sides, and an external swiveling connection between said members, including pivoted link bolts and springs between said bolts and the lugs.

4. The combination of ball and socket pipe members fitting together, one of said members having lugs at opposite sides, a yoke rotatably mounted on the other of said members, links pivoted to the yoke, and springs in compression between the links and the lugs, to draw the said members together.

5. The combination of ball and socket pipe members fitting together, a yoke rotatably mounted on one of said members and having arms at opposite sides, bolts pivoted to said arms, and springs between the bolts and the other member, and tending to draw said members together.

In testimony whereof, I affix my signature in presence of two witnesses.

CHARLES W. BEAUFORT.

Witnesses:
M. F. ROGERS,
GEO. E. TEW.

Copies of this patent may be obtained for five cents each, by addressing the "Commissioner of Patents, Washington, D. C."